No. 750,054. Patented January 19, 1904.

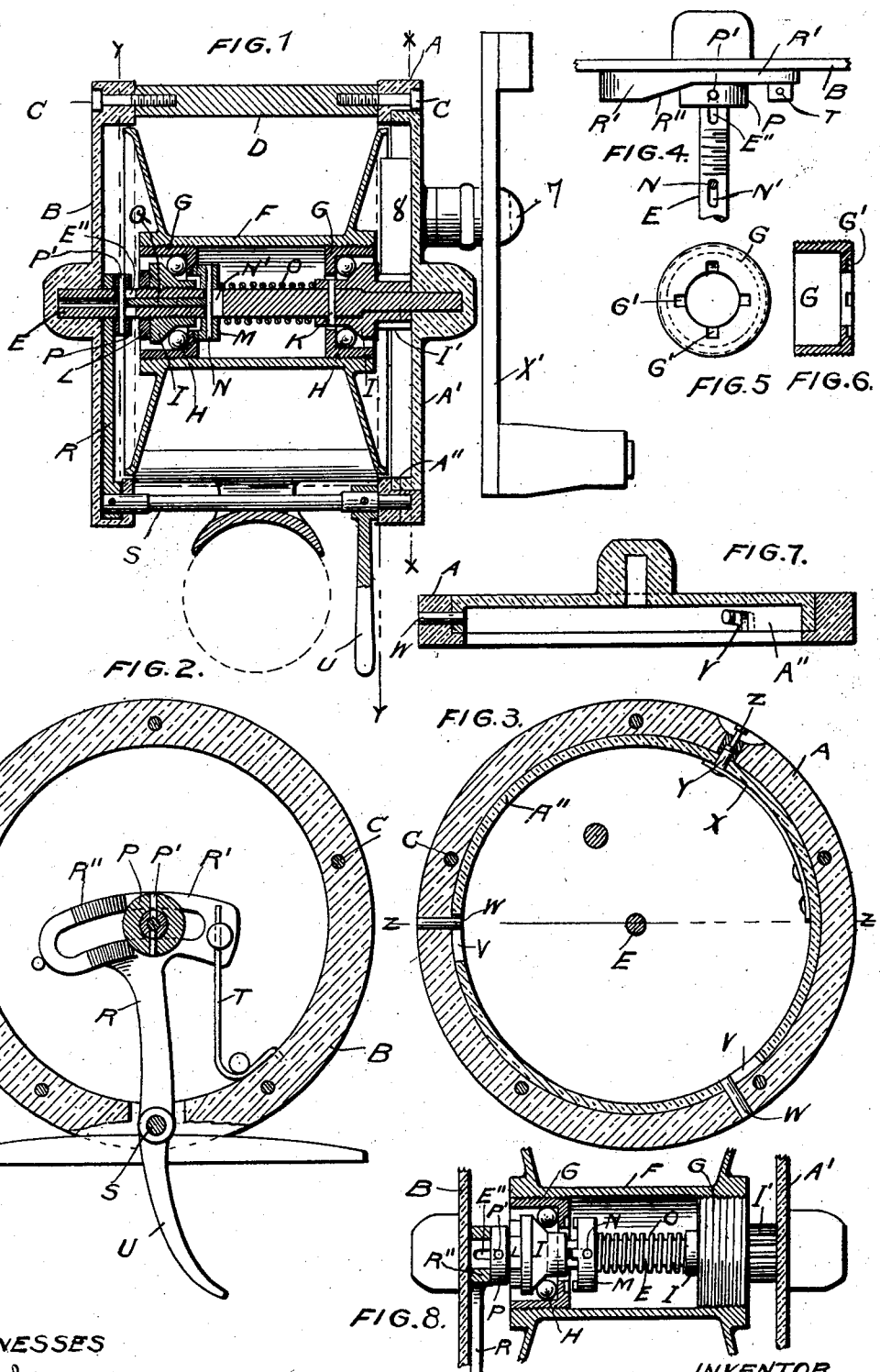

UNITED STATES PATENT OFFICE.

ROBERT L. HUNTER, OF MINNEAPOLIS, MINNESOTA, ASSIGNOR TO THE AMERICAN SIGNAL & POWER COMPANY, A CORPORATION.

FISHING-REEL.

SPECIFICATION forming part of Letters Patent No. 750,054, dated January 19, 1904.

Application filed March 26, 1900. Serial No. 10,306. (No model.)

*To all whom it may concern:*

Be it known that I, ROBERT L. HUNTER, of the city of Minneapolis, county of Hennepin, State of Minnesota, have invented certain new and useful Improvements in Fishing-Reels, of which the following is a specification.

This invention relates to improvements in fishing-reels, and particularly to improvements in the fishing-reel shown and described in my application for Letters Patent, filed July 31, 1899, Serial No. 725,562.

The objects of my present invention are to provide improved means for connecting or disconnecting the spool of the reel with the shaft on which it revolves and to provide improved means for securing the spool in the inclosing casing, so that it may be readily applied thereto or removed therefrom.

Other objects of the invention will appear from the following detail description, taken in connection with the accompanying drawings, in which—

Figure 1 is a longitudinal section of a fishing-reel embodying my invention. Fig. 2 is a section on line $y\ y$ of Fig. 1. Fig. 3 is a section on line $x\ x$ of Fig. 1. Figs. 4, 5, 6, 7, and 8 are details of parts of the reel.

The reel of my present invention, like that described in my former application, hereinbefore referred to, consists, primarily, of three main parts—a cage, a spool for the line mounted upon bearings within the cage, and mechanism for operating the spool. The cage itself in its general features is also in this instance of ordinary construction, consisting of the end plates A and B and the rods D, to which said plates are connected by means of the screws $c$. The end plate A is in the form of a ring, and its center consists of a separate plate A', secured to the ring by detachable connecting means, which permits the central section of the plate being removed quickly without the necessity of removing the screws or other ordinary fastening devices. When this section of the end plate is removed, the spool and the entire mechanism of the reel can be removed through the open end of the cage.

E represents the shaft of the reel, which is mounted so as to turn freely in bearings in the end plate. The spool F is mounted upon the shaft E by ball-bearings consisting of the sleeves G, screwed into the ends of the spool and forming races for the balls H and the conical collars or bearings I, that are secured upon the shaft E. The collar I at one end of the shaft is preferably secured to the shaft by means of a pin K, and I have also shown the driving-pinion I' formed integrally with the collar I. The collar at the opposite end of the spool is preferably screwed upon the shaft E, which is screw-threaded for a short distance for this purpose, and a nut L, serving as a locking-nut, is also screwed upon the shaft against the collar.

The shaft E is hollow for a portion of its length at the end opposite that carrying the pinion I', and a clutch member M is secured to the shaft by means of a pin N, that passes through a slot N' in the shaft E. A spring O surrounds the shaft E between the collar I and the clutch member M and tends to hold said clutch member in engagement with one of the collars G, which forms the other member of the clutch, being provided with suitable recesses or notches G' for this purpose, as shown in Figs. 5 and 6 of the drawings. Outside of the nut L the shaft E is provided with another transverse slot E'', and a collar P is arranged upon the shaft and provided with a pin P', which passes through the slot E''. This collar is free to slide on the shaft E. A short rod Q is arranged within the hollow shaft E between the transverse pins M and P', whereby as the collar P slides on the shaft E toward the nut L the clutch member M is also caused to slide on the shaft E against the tension of the spring O. This movement releases the clutch member M from engagement with the clutch-member on the spool; but when the collar P is released the spring O forces the clutch member M into engagement with the clutch member on the spool. For the purpose of causing the collar P to be moved quickly on the shaft when it is desired to release the spool from the shaft I provide the lever R, that is secured to the rod S, mounted in bearings in the end plates of the reel and capable of a partial rotation in said bearing. The inner end of the lever R is provided with the slotted head R' and is engaged by the spring T. The head R' is formed with the incline R''. (See Figs. 2 and 4.) A handle U is secured to the rod S, preferably at a point quite near the plate A A', as shown in Figs. 1 and 2. With this construction the clutch member on the shaft is normally held in engagement with the clutch member on the spool by means of the spring O, and the spring T normally holds the lever R in the position shown in Fig. 2 of the drawings, where the thin or narrow part of the head R' is shown to be in position with the collar P. When it is desired to disconnect the spool from the shaft, as for the purpose of casting, the operator grasps the lever U, which may ordinarily be done with one finger, and draws the lever or handle U toward himself. This moves the upper end of the lever R in the opposite direction, causing the incline R'' to move the collar P along the shaft E, and thereby, through the rod Q and pin N, disconnecting the clutch M from the clutch member on the spool and leaving the spool entirely free from the shaft or driving mechanism.

I have here shown the central section A' of one of the end plates provided with an inturned flange A'' (see Figs. 1 and 7) and secured to the ring or outer section A by means of the bayonet-joint slots V and pins W. I have also shown this flange provided with a spring X, carrying a pin Y, adapted to engage a recess or socket in the part A, thereby locking the section A' of the plate securely to the outer section A. A slide Z is provided in the ring-section A, adapted to be forced inward for the purpose of pressing the pin Y out of the socket in the ring-section A, and thereby permitting the central section A' to be unlocked and removed from the ring-section A. The section A', as in my former application, carries with it the usual crank X', shaft 7, and gear 8, meshing with the pinion I'. By removing the section A' of the end plate the crank, its shaft, and the gear on said shaft are all removed from the reel, so as to permit the spool and all of the mechanism except the lever R to be removed through the open end of the cage.

It will be understood that I do not confine myself to the details of the construction herein shown and described, as the same may be varied in many particulars without departing from my invention.

Having thus described my invention, I claim as new and desire to secure by Letters Patent—

1. In a fishing-reel, the combination, with a suitable cage, of a shaft mounted in bearings in the ends of said cage, a portion of said shaft being hollow, a spool mounted on said shaft, a clutch arranged within said spool and adapted to connect said spool and said shaft, a spring normally holding said clutch in engagement with said spool, a clutch-operating rod, extending through the hollow portion of said shaft, and an operating-lever for moving said rod.

2. In a fishing-reel, the combination, with the driving-shaft and the spool mounted thereon, of the clutch for connecting said spool and said shaft, the collar P for moving said clutch, the lever R provided with a slotted head having an incline R'' adapted to engage said collar, and a handle for moving said lever, substantially as described.

3. In a fishing-reel, the combination, with the cage provided with the end plate consisting of the ring A and the removable section A', of the bayonet-joint connection between said plate and said ring, and the spring-catch locking said section to said ring, for the purpose set forth.

4. In a fishing-reel, the cage, in combination, with a spool-shaft mounted in bearings in the ends of said cage, the crank upon the end of said cage, a pinion upon the end of said shaft, operated by said crank, a spool having bearings upon said shaft, a spring-pressed clutch upon said shaft between the bearings of said spool thereon, means slidable within said shaft for operating said clutch, means movable upon the end of said shaft to operate said slidable means, and an operating member associated with said means, substantially as described.

5. In a fishing-reel, the combination, of the cage, with the shaft having bearings therein, the spool having bearings upon said shaft, a clutch provided within the hub of said spool to connect the same with said shaft, means for driving said shaft, and means concealed between the end of the cage and the end of the spool for operating said clutch, substantially as described.

6. In a fishing-reel, the combination, of the cage, with the shaft having closed end bearings in said cage, the spool mounted upon said shaft, a clutch between said spool and shaft, means upon the cage for driving said shaft, a slide in said shaft for operating said clutch, and a cam-lever operating said slide through the medium of a part rotating with the shaft, substantially as described.

7. In a fishing-reel, the combination, of the cage, with the shaft therein, the spool mounted on ball-bearings on said shaft, the crank, and connections for driving said shaft in either direction, the clutch M, the slide Q, the slide-operating collar on said shaft, the cam-lever R, the rocking shaft S, and the operating-handle thereon, substantially as described.

8. In a fishing-reel, the cage, in combination, with the spool-shaft mounted in bearings in the ends of said cage, the crank mounted on the end of the cage, the spool mounted on said shaft, within the cage, the pinion mounted on said shaft between the end of the spool and the end of the cage, suitable means connecting said pinion and said crank, the clutch provided upon said shaft, within the cage, clutch-operating means provided between the end of the spool and the end of the cage and an external device connected with said means, substantially as described.

9. In a fishing-reel, the cage having suitable ends, one of which is provided with a central opening, in combination with the spool adapted for insertion or removal through said opening, the central section, closing the opening in said end and detachably secured therein, the central bearing provided in said section, a similar bearing provided in the opposite end of the cage, the shaft having its ends in said bearing, the bearings or journals for the spool on said shaft, the pinion on said shaft, within the cage, external driving means connected with said pinion, a clutch provided within the cage and normally connected with said shaft and spool, and external clutch-operating means, substantially as described.

In testimony whereof I have hereunto set my hand this 5th day of March, 1900.

ROBERT L. HUNTER.

In presence of—
G. EAMESQUIST,
R. SHERIDAN.